US011138237B2

(12) United States Patent
Anders et al.

(10) Patent No.: US 11,138,237 B2
(45) Date of Patent: Oct. 5, 2021

(54) SOCIAL MEDIA TOXICITY ANALYSIS

(71) Applicant: International Business Machines Corporation, Armonk, NY (US)

(72) Inventors: Kelley Anders, East New Market, MD (US); Jeremy R. Fox, Georgetown, TX (US); Liam S. Harpur, Skerries (IE); Jonathan Dunne, County Waterford (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 16/109,696

(22) Filed: Aug. 22, 2018

(65) Prior Publication Data
US 2020/0065417 A1  Feb. 27, 2020

(51) Int. Cl.
*G06F 16/28* (2019.01)
*G06Q 50/00* (2012.01)
*G06F 16/955* (2019.01)

(52) U.S. Cl.
CPC .......... *G06F 16/285* (2019.01); *G06F 16/955* (2019.01); *G06Q 50/01* (2013.01)

(58) Field of Classification Search
USPC ........................................................ 707/739
See application file for complete search history.

(56) References Cited

U.S. PATENT DOCUMENTS

| 8,955,127 B1 | 2/2015 | Sokolov et al. |
| 2007/0168463 A1* | 7/2007 | Rothschild ............. G06Q 10/10 709/217 |
| 2014/0019118 A1 | 1/2014 | Tromp |
| 2014/0019548 A1* | 1/2014 | Rafsky ................... G06Q 10/10 709/204 |
| 2015/0112753 A1 | 4/2015 | Suvarna |

(Continued)

OTHER PUBLICATIONS

Julia Angwin, Facebook's Secret Censorship Rules Protect White Men From Hate Speech But Not Black Children, Jun. 28, 2017, ProPublica, https://www.propublica.org/article/facebook-hate-speech-censorship-internal-documents-algorithms (Year: 2017).*

(Continued)

*Primary Examiner* — Allen S Lin
(74) *Attorney, Agent, or Firm* — Garg Law Firm, PLLC; Rakesh Garg; Michael O'Keefe (57) ABSTRACT

From social media content using a processor and a memory, a class model is constructed that is representative of a type and a level of toxicity associated with the content. A first social media message is analyzed, using a processor and a memory, to compute a first toxicity score associated with the first social media message and assign the first social media message to a first class of the class model. A second social media message is analyzed, using a processor and a memory, to compute a second toxicity score associated with the second social media message and assign the second social media message to a second class of the class model. Based on the first toxicity score, the first class, the second toxicity score, and the second class, a toxicity trend is forecasted. In response to the toxicity trend being forecasted to increase, a remedial measure is applied to reduce the toxicity trend.

15 Claims, 8 Drawing Sheets

(56) References Cited

U.S. PATENT DOCUMENTS

| | | | |
|---|---|---|---|
| 2015/0278195 A1* | 10/2015 | Yang | G06F 40/30 |
| | | | 704/9 |
| 2016/0036748 A1 | 2/2016 | Bastide | |
| 2016/0269342 A1 | 9/2016 | Bank | |
| 2017/0308523 A1 | 10/2017 | Wang | |
| 2019/0155918 A1* | 5/2019 | Jaroch | G06N 20/00 |
| 2019/0197125 A1* | 6/2019 | Ma | G06F 16/438 |
| 2019/0228368 A1* | 7/2019 | Peck | G06Q 10/063116 |

OTHER PUBLICATIONS

Anonymous; Sentiment Analysis for Outbound Social Media Screening, An IP.com Prior Art Database Technical Disclosure; IP.com No. IPCOM000233590D; Dec. 17, 2013.

\* cited by examiner

SOCIAL MEDIA TOXICITY ANALYSIS

TECHNICAL FIELD

The present invention relates generally to a method, system, and computer program product for social media data analysis. More particularly, the present invention relates to a method, system, and computer program product for social media toxicity analysis.

BACKGROUND

Social media comprises any medium, network, channel, or technology for facilitating communication between a large number of individuals and/or entities (users). Some common examples of social media are Facebook or Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional sharing of content, bi-directional messages, or broadcast communications in a variety of languages and forms. Such communications in the social media are commonly referred to as "posts". The contents of posts can include natural language conversation, images, multimedia, and/or links or references, any of which can be in proprietary conversational styles, slangs or acronyms, urban phrases in a given context, formalized writing or publication, and other structured or unstructured data.

Users increasingly interact with each other through email, messaging, social media, and other networked communication tools. As such interactions become more ubiquitous, the quality of those interactions also becomes more important. Positive experiences during social interactions encourage users to continue to increase the usage of a social media platform, increasing the value of the platform to users, advertisers, and those who operate the platform. Conversely, negative experiences during social interactions encourage users to leave a social media platform or reduce the usage of the platform.

SUMMARY

The illustrative embodiments provide a method, system, and computer program product. An embodiment includes a method that constructs, from social media content using a processor and a memory, a class model that is representative of a type and a level of toxicity associated with the content. The embodiment analyzes, using a processor and a memory, a first social media message to compute a first toxicity score associated with the first social media message and assign the first social media message to a first class of the class model. The embodiment analyzes, using a processor and a memory, a second social media message to compute a second toxicity score associated with the second social media message and assign the second social media message to a second class of the class model. The embodiment forecasts, based on the first toxicity score, the first class, the second toxicity score, and the second class, a toxicity trend. The embodiment applies, in response to the toxicity trend being forecasted to increase, a remedial measure to reduce the toxicity trend.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Positive interactions—on-topic information exchanges that are useful to the participants, politeness, interesting participants, and the like—encourage users to associate an increased personal value or usefulness with a platform. Such users use the platform more frequently and regularly, try new aspects of the platform, and recommend the platform to others. Conversely, negative interactions—abuse, name-calling, personal attacks, and similar behavior—encourage users associate a decreased personal value or usefulness with a platform. Such users may engage in negative behaviors of their own, avoid areas of the platform, reduce their platform usage or leave altogether, and are unlikely to recommend the platform to others. As well, although when interacting with each other individuals conduct conservations and social discourse similarly to the way they would in person, nuance, sarcasm, context, non-verbal information, and other social cues are often missing from online interactions. As a result, small levels of toxicity in messages which go unchecked over time often grow, quickly resulting in toxicity levels so great that users do not value a platform.

As used herein, "toxicity" is defined as the likelihood that a comment, message, posting, or other social media communication will drive other participants away from a conversation, forum, or other social media interaction. Such social media interactions occur on social media platforms. Social media platforms, as used herein, include any system allowing users to interact with each other. Social media interactions, as used herein, include any such user-to-user or user-to-group interaction via a social media platform. Such systems include general-purpose interaction platforms such as Facebook, Twitter, Instagram, and Reddit, sections of larger platforms—such as user comments sections on content-sharing sites like YouTube and news organizations—and smaller, specialized forums, centered around subjects including anything from solo law practice to horses, aviation, or knitting. (Facebook is a registered trademark of Facebook, Inc. Twitter is a registered trademark of Twitter, Inc. Instagram is a registered trademark of Instagram, LLC. Reddit is a registered trademark of Reddit, Inc. YouTube is a registered trademark of Google, LLC.) Users interact with social media platforms using any suitable method, including sending and receiving email or other messages, composing and reading content directly on a website, and composing and reading content using a software application.

Various social media platforms have attempted to minimize toxicity, with little success. Some have used human moderators, but finding human moderators willing to spend their workdays being exposed to negative content is difficult. Sampling content and routing only some of it to moderators risks missing negative content, while having a human moderator to approve each posting can slow platforms that prize speed and immediacy of reaction, as well as require an unacceptably large team. Some platforms have relied on users to report bad behavior—but this can be slow, inconsistent, and users are still exposed to the bad behavior during the reporting process. Some platforms have hidden comments and similar user interactions, requiring users to take affirmative steps to see them, and other platforms have shut down user interactions altogether—but these steps eliminate much of the utility of social media platforms.

Accordingly, what is needed in the art is a social media toxicity analysis and monitoring solution that can identify small problems before they become large, and alert human moderators or take appropriate steps to react to toxic content independently. The illustrative embodiments recognize that the presently available tools or solutions do not address these needs or provide adequate solutions for these needs. The illustrative embodiments used to describe the invention generally address and solve the above-described problems and other problems related to social media toxicity analysis.

An embodiment can be implemented as a software application. The application implementing an embodiment can be configured as a modification of an existing social media platform, as a separate application that operates in conjunction with an existing social media platform, a standalone application, or some combination thereof.

Particularly, some illustrative embodiments provide a method by which the type and level of toxicity present in social media interactions can be determined, and take measures to lower the toxicity level.

An embodiment analyzes interactions on a social media platform. To determine topics being discussed, an embodiment conducts topic analysis on content on the social media platform. For example, commercially available natural language understanding services analyze unstructured content to extract metadata from that content, including concepts, categories, and keywords. One such technique, Latent Dirichlet Allocation, assigns topics to documents, based on topic-related words used in those documents. For example, if a document frequently includes words such as "milk", "meow", and "kitten", latent Dirichlet allocation can classify the document as cat-related, while a document that frequently includes "puppy", "bark", and "bone" can be classified as dog-related. In particular, for each social media message an embodiment examines, the embodiment produces a topic model, including each of the words in the message and a probability corresponding to the likelihood that each of the words corresponds to a designated toxicity level. An embodiment further refines the topic model into a set of key terms associated with the topic model.

An embodiment also analyzes content on the social media platform to identify specific emotions or tones within the content. For example, commercially available natural language understanding services analyze unstructured content, producing both overall sentiment and emotion information for an entire piece of content and targeted sentiment and emotion information associated with specific keywords, sentences, or other units within the content. In particular, for each social media message an embodiment examines, the embodiment produces a sentiment score corresponding to the entire piece of content and emotion scores for various emotions corresponding to the entire piece of content. One embodiment scores five emotions—joy, anger, disgust, sadness, and fear—although more, fewer, or different emotions are also contemplated within the scope of the embodiments. As part of the tone analysis, an embodiment also computes text relevance scores reflecting the degree of relevance of keywords in the content with a topic, name category scores reflecting the degree of relevance of particular keywords to particular categories of keywords (for example, associating swimming with the "sport" type or a proper name with the "person" type), and taxonomy scores.

An embodiment also analyses the message velocity of an interaction—in other words, how quickly an interaction is proceeding, based on a rate of receiving the messages that make up the interaction. In particular, an embodiment models the differences between the timestamps on social media content into one of a number of known distribution types. For example, a rapid sequence of messages—perhaps one every few seconds—having similar content could indicate a particular type of discourse, for example an angry exchange, while a slower sequence could indicate a calmer exchange.

An embodiment derives a class model reflecting the results of the topic analysis, tone analysis, and message velocity analysis, on a per-individual, per-forum, or other appropriate basis. The class model represents the type and level of toxicity in the content analyzed. An embodiment derives the class model using latent class analysis, inferring a taxonomy to understand which types of behavior—as surfaced in social media content and message timing—are suggestive of a particular grouping or cluster. The class model characterizes each class as a pattern of conditional probabilities, each indicating the chance that a variable associated with the class will take on certain values. Other techniques of cluster analysis may also be used to derive an appropriate class model without departing from the scope of the embodiments.

For example, a parent class in the class model could be a parent class related to toxicity. As more content exhibiting different types of toxicity is received, an embodiment can further divide the toxicity parent class into classes—for example body shaming and cyberbullying. Here, all posts that appear to include body shaming would be grouped into the "body shaming" class, and all posts that appear to include cyberbullying would be grouped into the "cyberbullying" class. There could be overlap—for example, the cyberbullying could include body shaming—related insults—and such content would be included in both topics.

Given sufficient content to classify, an embodiment also further divides topics into subclasses. For example, for the "body shaming" topic, given enough content and enough of a distinction between posts body shaming men and those body shaming women, content can be further divided into "male" and "female" subclasses, representing content relating to male body shaming and female body shaming respectively. Similarly, for the "cyberbullying" topic, an embodiment can further group content into subclasses such as "from friends", "from strangers", and "from colleagues". Just as content can be classified into more than one class, an embodiment can also classify content into more than one subclass. For example, work colleagues are often also friends, so a particular post relating to the "cyberbullying" class could fall into both the "from friends" and "from colleagues" subclasses.

If appropriate for the content to be classified, an embodiment includes further levels of subclasses. For example, given enough posts in the "cyberbullying" topic and the "from friends" subclass and enough of a distinction between posts from male users and those from female users, the "from friends" subclass could be further divided into "from male friends" and "from female friends".

As well, some social media forums focus only on specific topics, such as horses, aviation, or knitting, or specific subtopics, such as particular horse sports or particular types of airplanes. Many such forums have rules regarding off-topic posts—for example, limiting such posts to particular areas, permitting them only on certain days, or banning such posts altogether. For such forums, an embodiment supports off-topic post rules by including an "off-topic" topic in the class model. For example, if a user routinely posts content that is not aviation-related in an aviation-only forum, the embodiment classifies the non-aviation content into an "off-topic" class.

Each topic modelled in the class model includes specific keywords related to the topic. For example, the keyword "fat" likely relates to the "body shaming" topic, but not the "cyber bullying" topic. Each topic modelled in the class model may also include a sentiment score and one or more emotion scores related to the topic. For example, the "body shaming" topic could be associated with a high negative sentiment score, but a low score for the joy emotion. In an embodiment, the class model is implemented using a probability matrix, in which each entry in the matrix represents the likelihood that a variable represented by the entry will take on a certain value.

Once an embodiment has analyzed sufficient content to construct a class model, the embodiment can use the same analysis tools, as well as the class model, to classify new content, predict trends, and take action based on the predicted trends. To classify new content, an embodiment assigns a class using the presence of certain keywords, and combines scores related to the presence of class-relevant keywords, sentiment scores, and emotion scores into a composite toxicity score for the content. For example, based on the presence of certain keywords and high levels of negative sentiment and anger scores, an embodiment classifies a new piece of content into a "body shaming" class.

An embodiment predicts trends based on the analyzed content. For example, if the composite toxicity score for posts from one particular user is increasing from post to post, and the posts are also becoming more frequent, there is a high probability that this user is upset and will continue to post in this negative manner, or even get worse, for the next thirty minutes. As another example, if a small group of users is posting, at a rate that exceeds a threshold posting rate of posting, negative content associated with the "cyberbullying class", and all the content includes references, exceeding a reference frequency threshold, to another user, there is a high probability that this group is targeting this other user and that the behavior will continue for the next day. As a third example, if toxicity scores for new content are falling and time lags between new content are rising, there is a good probability that this polite behavior will continue on an upward trend.

An embodiment provides social media platform administrators with a toxicity analysis, including a location of the toxicity—such as a particular thread, conversation, group, or forum—and a trending of that toxicity. Based on the toxicity analysis, administrators can order remedial measures, or the embodiment applies remedial measures appropriate to the situation automatically.

An embodiment implements user-based remedial measures. For example, the single angry user who appears to be trending towards additional anger could be first warned, then blocked from posting for the next hour if the behavior continues. The group of cyberbullies could be allowed to post, but only content that is not related to their bullying target. Conversely, additional bad behavior from the same users could result in increased remedial measures, such as slowing their allowed posting rate, subjecting their postings to a moderation process, longer banning periods, or even a permanent ban from the platform. Or, if a user is well-behaved in one portion of a social media platform but badly behaved in another portion, the user could be moderated, suspended, or banned, from posting in the problem portion. As a result of these remedial measures, the embodiment acts to lower the toxicity level for all users of the forum.

An embodiment implements content-based remedial measures. For example, an embodiment allows distribution of content with a high toxicity score to only specific users or groups, while allowing distribution of content with a low toxicity score to a larger-than-a-threshold number of the users.

In addition, an embodiment continually updates the class model as new content is posted. Such updates allow the class model to react efficiently to new forms of bad behavior, and to evaluate the effectiveness of particular remedial measures in particular circumstances. For example, if a one-hour suspension proves consistently effective for users who engage in body shaming but consistently ineffective for users who engage in cyberbullying, an embodiment can be configured to eliminate the one-hour suspension option from the remedial measures available in cases of cyberbullying.

Social media implementations are a well-recognized technological field of endeavor. Presently available methods do not allow social media toxicity analysis based on learned details of content posted on a social media platform. The manner of social media toxicity analysis described herein is unavailable in the presently available methods. A method of an embodiment described herein, when implemented to execute on a device or data processing system, comprises substantial advancement of the functionality of that device or data processing system in intelligently analyzing social media content for toxicity.

The illustrative embodiments are described with respect to certain types of contents, content types, transmissions, periods, forecasts, thresholds, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
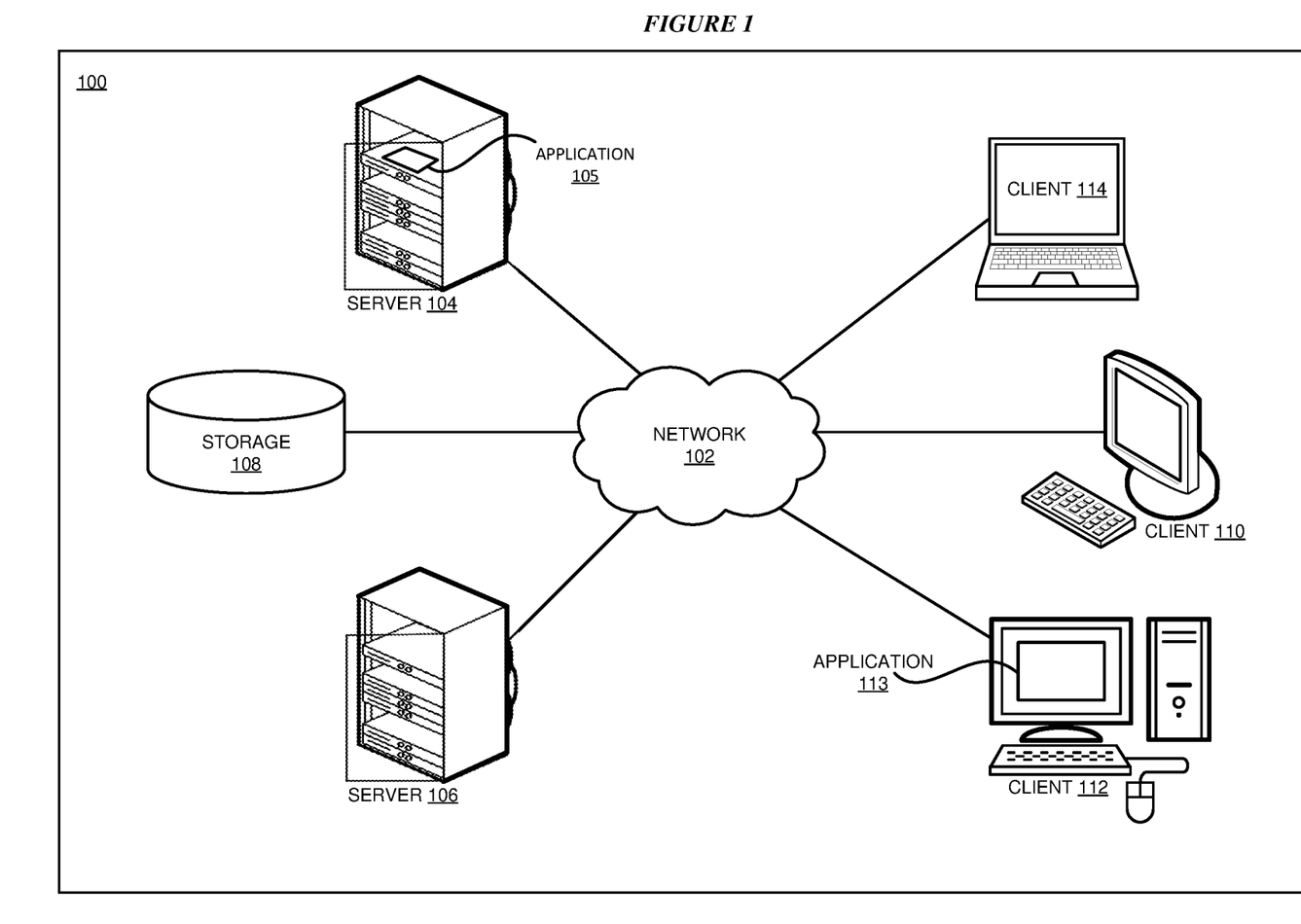
FIG. 1 depicts a pictorial representation of a network of data processing systems in which illustrative embodiments may be implemented.
Figure 2:
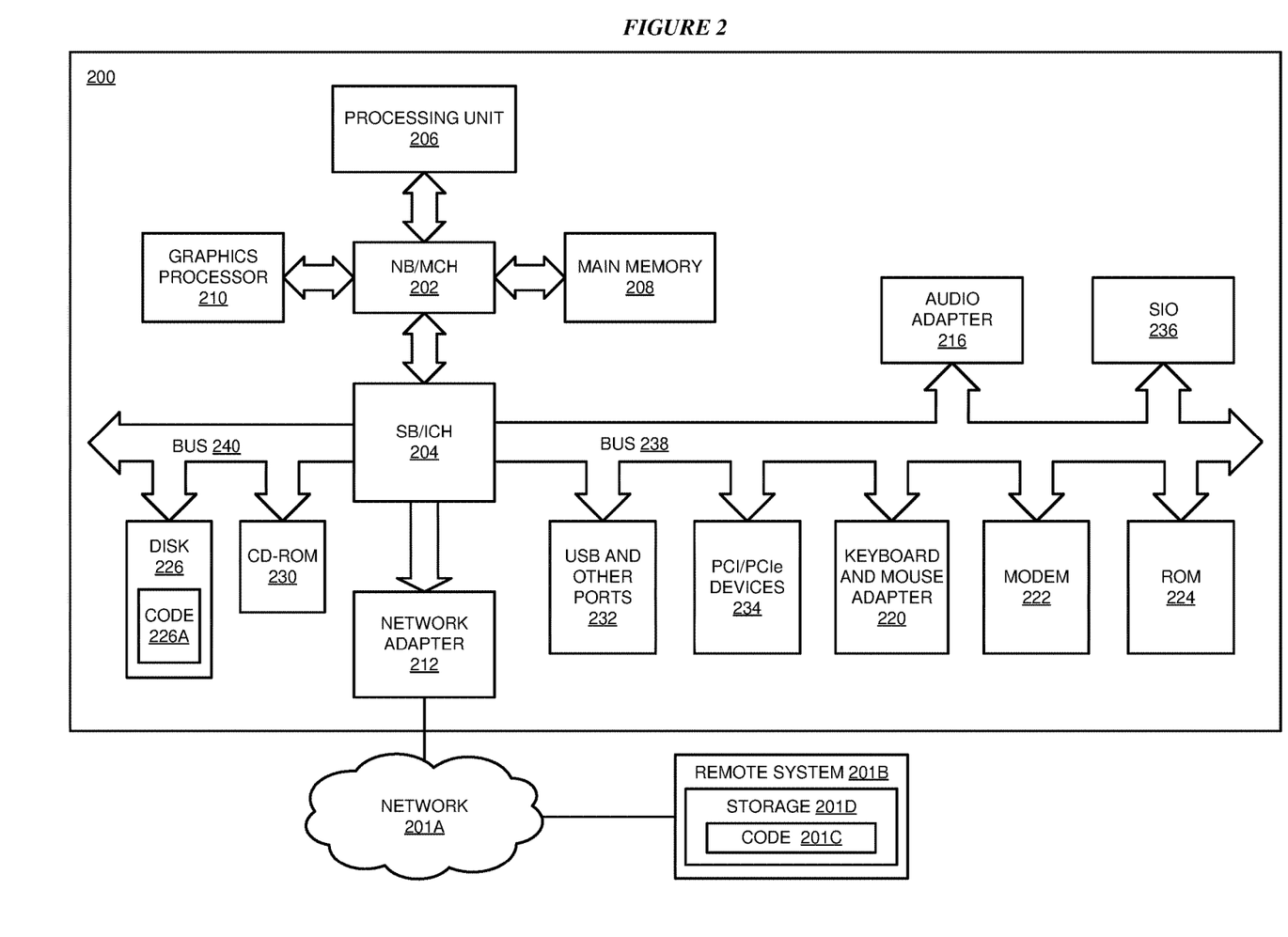
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include application 105 that communicates using a particular data communication protocol. Client 112 may include application 113 that may communicate with application 105 over the selected protocol. For example, applications 105 and 113 may communicate heartbeats and heartbeat response with each other over TCP/IP.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Among other uses, data processing environment 100 may also be used for implementing a social media platform in which the illustrative embodiments may be implemented. The social media platform may be administered using, for example, application 105 running on server 104. Application 105 also monitors content on the social media platform that arrives at server 104 via network 102. Users of the social media platform may interact with each other using, for example, application 113 running on client 112. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
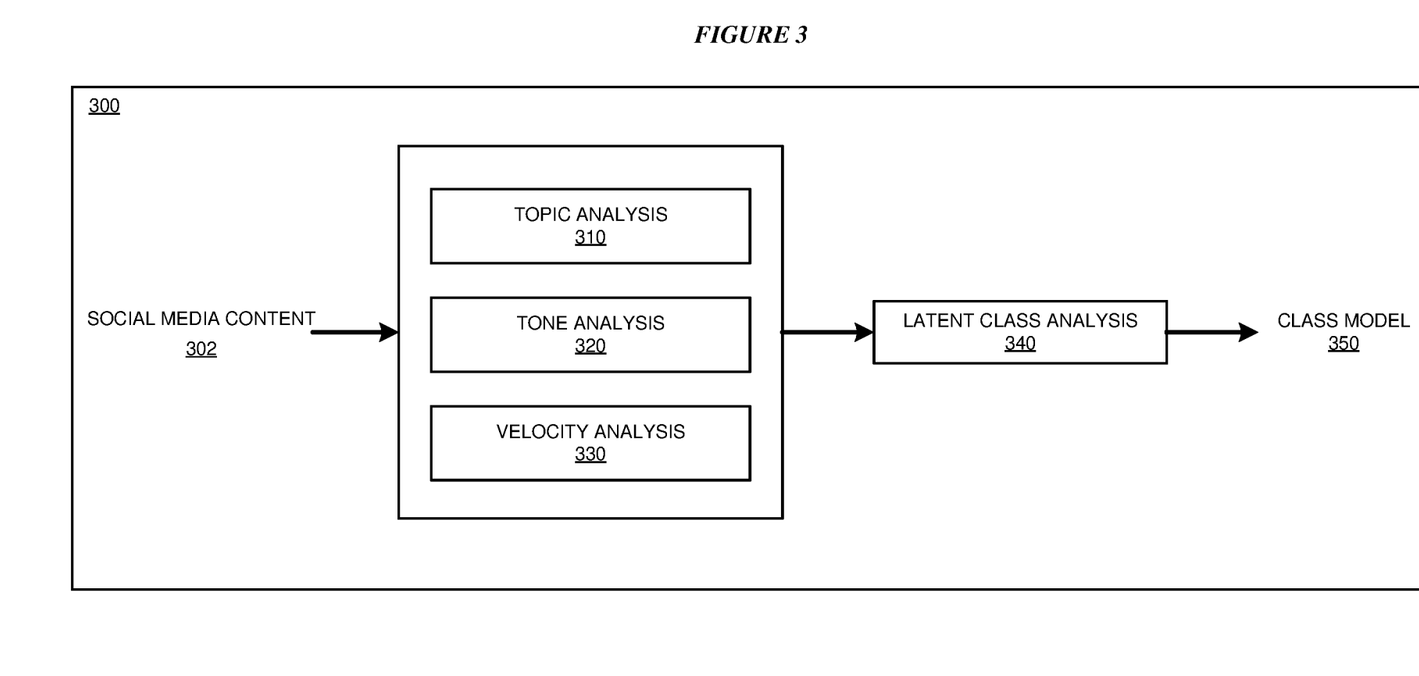
FIG. 3 depicts a block diagram of an example application for performing social media toxicity analysis in accordance with an illustrative embodiment.

With reference to FIG. 3, this figure depicts a block diagram of an example application for performing social media toxicity analysis in accordance with an illustrative embodiment. Application 300 is an example of application 105 in FIG. 1.

Social media content 302 feeds into topic analysis module 310, tone analysis module 320, and velocity analysis module 330. Topic analysis module 310 conducts topic analysis on social media content 302, producing a topic model and a set of key terms associated with the topic model. Tone analysis module 320 conducts an emotion or tone analysis on social media content 302, producing a sentiment score corresponding to an entire piece of content and emotion scores for various emotions corresponding to an entire piece of content. Tone analysis module 320 produces emotion scores corresponding to five emotions—joy, anger, disgust, sadness, and fear. Tone analysis module 320 also produces text relevance scores for particular keywords in a piece of content, name type scores that associate the relevance of particular keywords to particular types of keywords, and hierarchy scores. Velocity analysis module 330 models the differences between the timestamps on social media content into one of a number of known distribution types.

Using latent class analysis module 340, application 300 derives class model 350 from the results of topic analysis module 310, tone analysis module 320, and velocity analysis module 330. Class model 350 represents the type and level of toxicity in the content analyzed.

Figure 4:
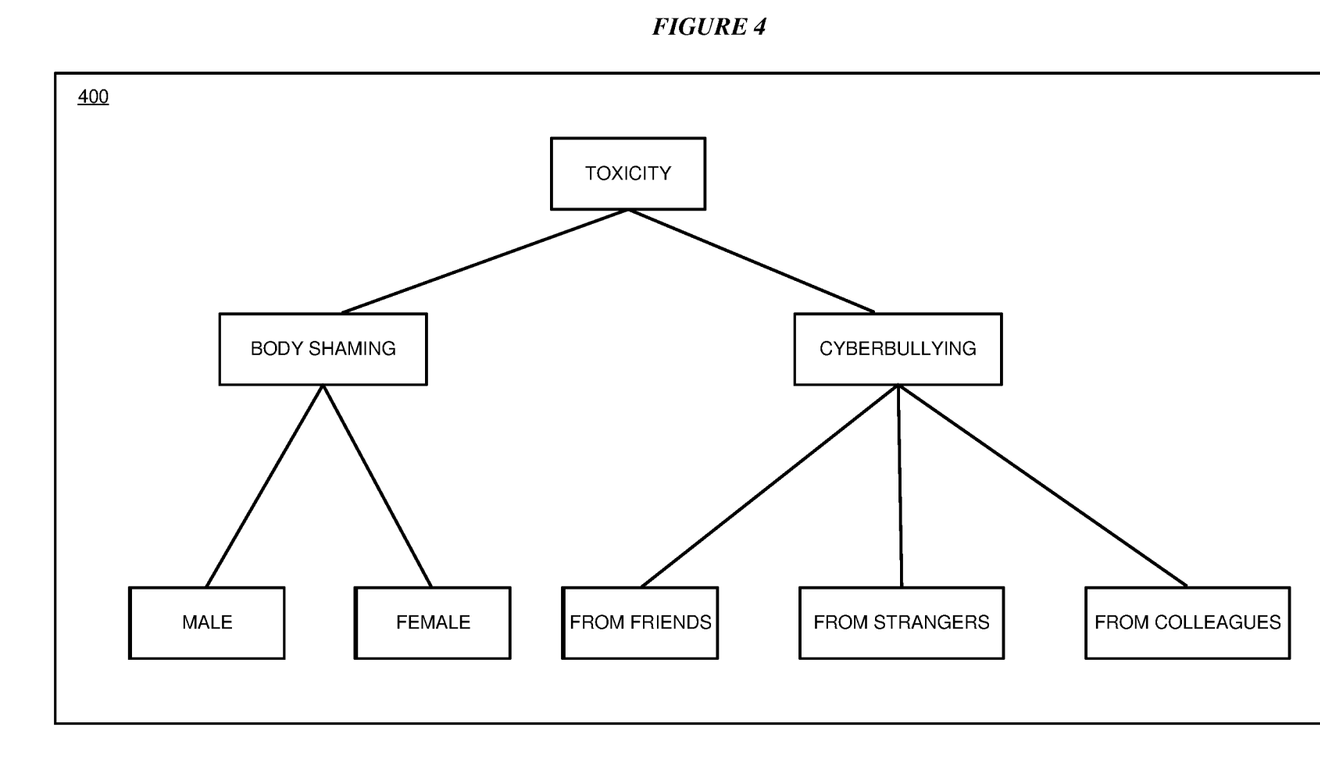
FIG. 4 depicts an example class model 400 in accordance with an illustrative embodiment.

FIG. 4 depicts an example class model 400 in accordance with an illustrative embodiment. Example class model 400 is an example of class model 350 in FIG. 3. Example class model 400 includes two classes, "body shaming" and "cyberbullying". The "body shaming" class is further divided into "male" and female" subclasses, while the "cyberbullying" class is further divided into "from friends", "from strangers", and "from colleagues" subclasses.

Figure 5:
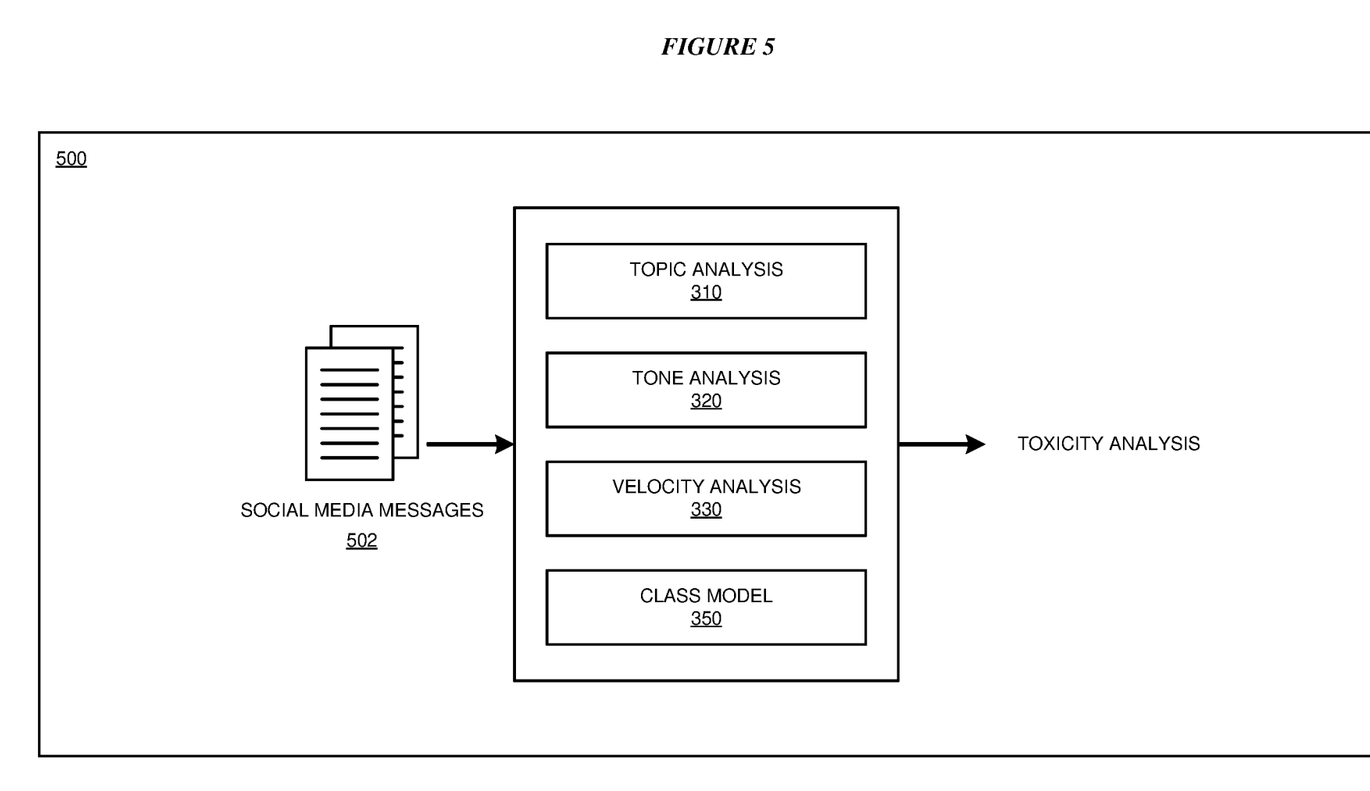
FIG. 5 depicts a block diagram of an example application for performing social media toxicity analysis in accordance with an illustrative embodiment.

With reference to FIG. 5, this figure depicts a block diagram of an example application for performing social media toxicity analysis in accordance with an illustrative embodiment. Application 300, topic analysis module 310, tone analysis module 320, velocity analysis module 330, and class model 350 are the same as application 300, topic analysis module 310, tone analysis module 320, velocity analysis module 330, and class model 350 in FIG. 3. FIG. 5 depicts application 300 configured to analyze individual social media messages 502, once class model 350 has been constructed.

In FIG. 5, social media messages 502 feed into topic analysis module 310, tone analysis module 320, velocity analysis module 330, and class model 350.

For example, consider a single example of social media messages 502. Toxic phrase A contains 40 words that negatively describe an individual's appearance and weight in a photograph. Topic analysis module 310 produces a corresponding keyword analysis:

Word or phrase A: 0.133160
Word or phrase B: 6.655e-05
Word or phrase C: 0.3456
Word or phrase D: 0.066613
Word or phrase E: 0.199707
Word or phrase F: 6.655e-05
Word or phrase G: 6.655e-05

Each entry in the keyword analysis includes a word, and a probability that the word corresponds to a designated toxicity level.

For the same example message, tone analysis module 320 produces a sentiment score of −0.31. Tone analysis module 320 produces the following emotion scores: joy=0.31, anger=0.22, disgust=0.18, sadness=0.34, and fear=0.18. Tone analysis module 320 also produces the following text relevance scores: "phrase A"=0.97, "phrase B"=0.96, "phrase C"=0.79, "phrase D"=0.65, "phrase E"=0.65, "phrase F"=0.63, "phrase G"=0.63. Tone analysis module 320 also produces two name category scores: "Frank" Person 0.77 and "swimming" Sport 0.46. Tone analysis module 320 also produces three taxonomy scores: "/pets/large animals"=0.57, "/finance/personal finance/insurance/travel insurance"=0.42, and "/health and fitness/weight loss"=0.37. All scores are on a 0-1 scale.

Velocity analysis module 330 models the differences between the timestamps on different social media messages 502 into one of a number of known distribution types. Class model 350 classifies the output of each of topic analysis module 310, tone analysis module 320, velocity analysis module 330 into a toxicity analysis. The toxicity analysis includes one or more classes in class model 350 and a composite toxicity score corresponding to social media message 502. For example, the social media message 502 quoted herein would be classified into the "body shaming" class, and would also have a composite toxicity score reflecting the computed scores.

Figure 6:
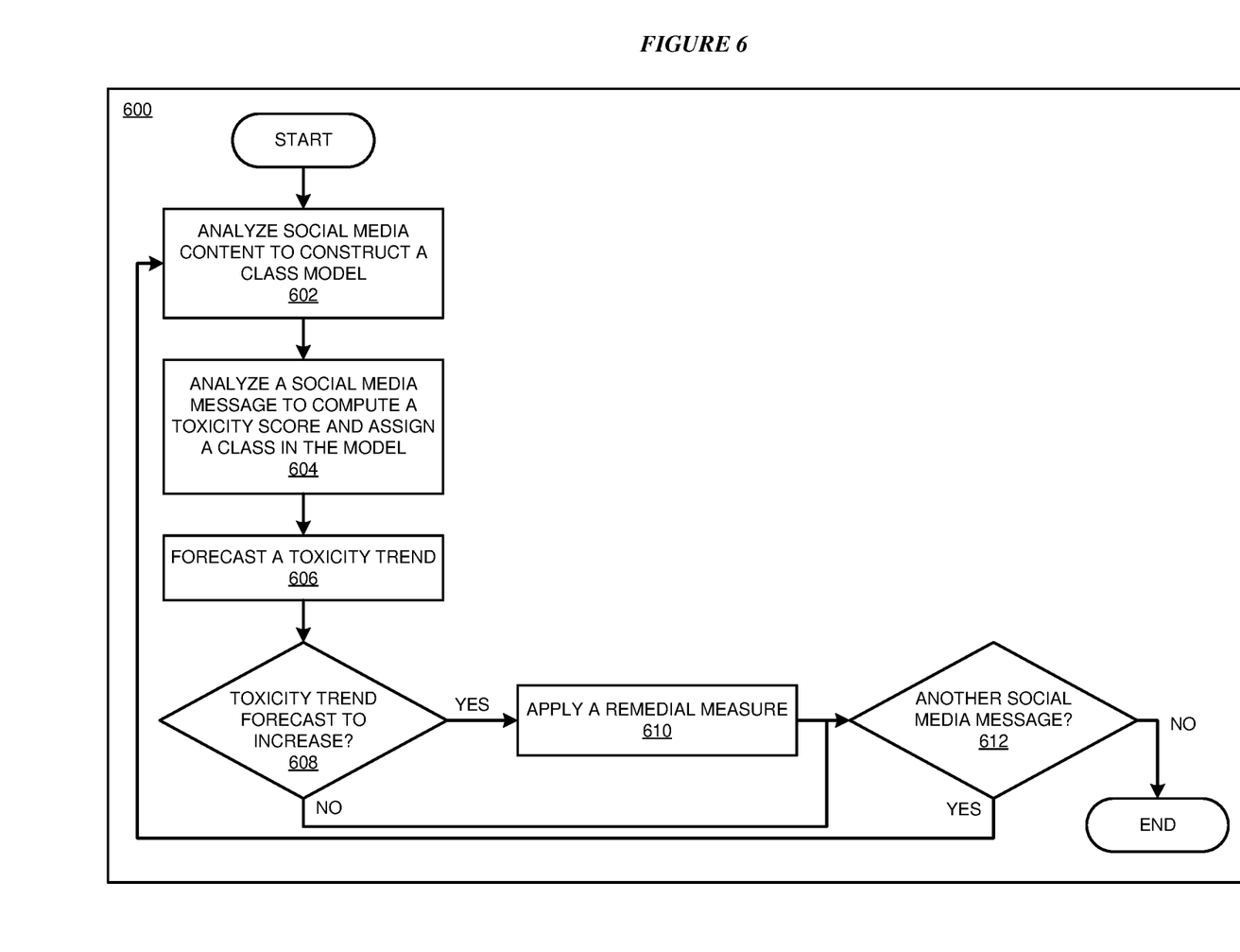
FIG. 6 depicts a flowchart of an example process for social media toxicity analysis in live streaming in accordance with an illustrative embodiment.

FIG. 6 depicts a flowchart of an example process for social media toxicity analysis in live streaming in accordance with an illustrative embodiment. Process 600 can be implemented in application 300 in FIG. 3 or FIG. 5.

Over time, as users of a social media platform post content, the application analyzes each piece of content, constructing a class model that is representative of a type and level of toxicity associated with the content (block 602). Once the application has processed sufficient content to enable construction of the class model, in block 604 the application analyzes a social media message to compute a toxicity score associated with the first social media message and assigns the first social media message to a class of the class model. In block 606, the application forecasts a toxicity trend based on the toxicity score, the class, and previous toxicity scores and classes computed for previous social media messages. In block 608, the application determines whether the toxicity trend is forecasted to increase. If so ("YES" path of block 608), in block 610 the application applies a remedial measure to reduce the forecasted toxicity trend. In either case, the application then checks whether there is another social media message to analyze (block 612). If so ("YES" path of block 612), the application returns to block 604 to analyze the new social media message. If not ("NO" path of block 612), the application ends.

Figure 7:
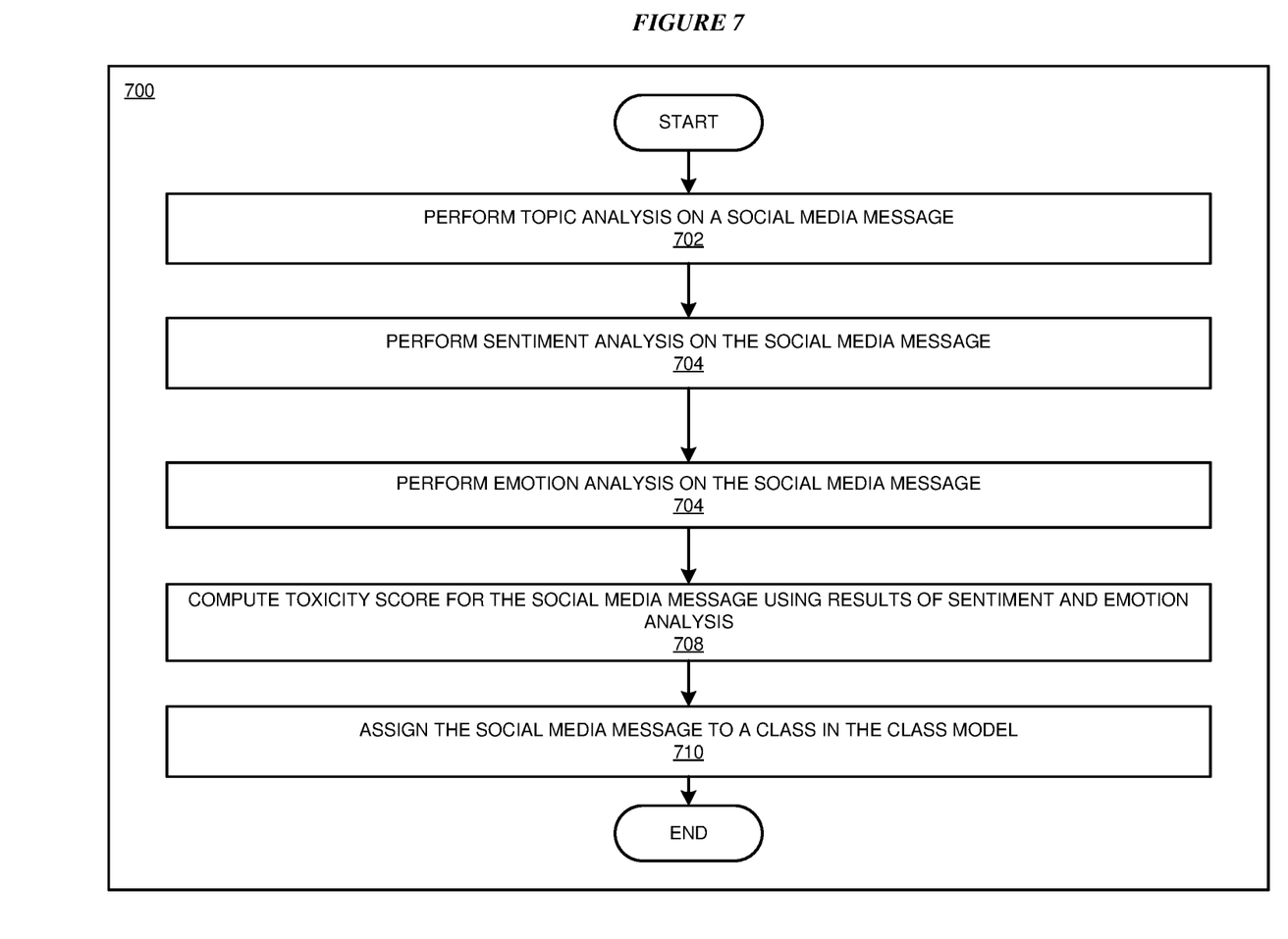
FIG. 7 depicts a flowchart of an example process for social media toxicity analysis in live streaming in accordance with an illustrative embodiment.

FIG. 7 depicts a flowchart of an example process for social media toxicity analysis in live streaming in accordance with an illustrative embodiment, showing further details of block 604 in FIG. 6. Process 700 can be implemented in application 300 in FIG. 3 or FIG. 5. The application starts in block 702, where the application performs topic analysis on a social media message. In block 704, the application performs sentiment analysis on the same social media message, and in block 706, the application performs emotion analysis on the social media message. In block 708, based on the results of the sentiment and emotion analyses, the application computes a composite toxicity score for the social media message. In block 710, the application, based on the presence of keywords identified by the topic analysis and the toxicity score, classifies the social media message into a class of the class model constructed in block 602 of FIG. 6. Then the application ends.

Figure 8:
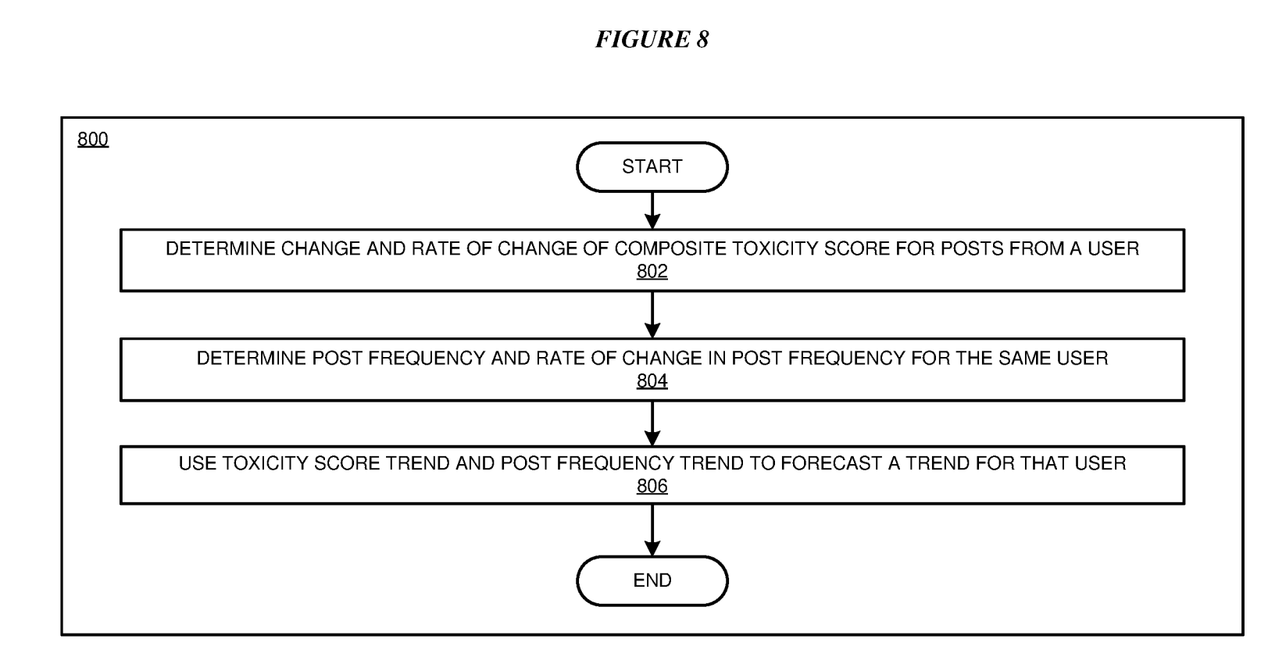
FIG. 8 depicts a flowchart of an example process for social media toxicity analysis in live streaming in accordance with an illustrative embodiment, showing further details.

FIG. 8 depicts a flowchart of an example process for social media toxicity analysis in live streaming in accordance with an illustrative embodiment, showing further details of block 606 in FIG. 6. Process 800 can be implemented in application 300 in FIG. 3 or FIG. 5. The application starts in block 802, where the application determines both the change, and the rate of change, of the composite toxicity score computed for posts from a particular user. In block 804, the application determines the post frequency and the rate of change of the post frequency, of posts for that same user. In block 806, the application uses the toxicity score and post frequency trends to forecast a toxicity trend for that particular user. The application also executes blocks 802-806 for a group of users instead of an individual, to forecast a toxicity trend for that group of users. Then the application ends.

Thus, a computer implemented method, system or apparatus, and computer program product are provided in the illustrative embodiments for social media toxicity analysis and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    constructing, from social media content using a processor and a memory, a class model that is representative of a type and a level of toxicity associated with the content, the class model constructed based on analyzing an interaction between human participants within the social media content to determine a topic associated with the interaction, a sentiment score associated with the interaction, and an elapsed time between a first message in the interaction and a second message in the interaction, the level of toxicity comprising a probability that the interaction will cause another participant on a social media platform to disengage from the interaction;
    analyzing, using the processor and the memory, a first social media message to compute a first level of toxicity associated with the first social media message and assign, based on a first topic and a first sentiment score associated with the first social media message, the first social media message to a first class of the class model, the first level of toxicity comprising a first score related to a presence of a set of keywords related to the first class of the class model in the first social media message and the first sentiment score and a first set of emotion scores associated with the first social media message;
    analyzing, using the processor and the memory, a second social media message to compute a second level of toxicity associated with the second social media message and assign, based on a second topic and a second sentiment score associated with the second social media message, the second social media message to a second class of the class model, the second level of toxicity comprising a second score related to a presence of a set of keywords related to the second class of the class model in the second social media message and the second sentiment score and a second set of emotion scores associated with the second social media message;
    forecasting, based on the first level of toxicity, the first class, the second level of toxicity, and the second class, a forecast toxicity trend related to a sender of the first social media message and of the second social media message, the forecast toxicity trend comprising a predicted toxicity direction and a predicted time period of the predicted toxicity direction; and
    applying, in response to the forecast toxicity trend being forecasted to increase, a remedial measure to reduce the forecast toxicity trend, the remedial measure comprising altering, according to the first level of toxicity and the first class, a distribution within the social media platform of the first social media message and a message sending ability on the social media platform of the sender of the first social media message and of the second social media message; and
    adjusting, according to a set of levels of toxicity associated with a set of social media messages sent subsequent to application of the remedial measure, the class model.

2. The method of claim 1, wherein constructing the class model based on the topic, the sentiment score, and the elapsed time further comprises:
    constructing the class model using a latent class analysis.

3. The method of claim 1, wherein constructing the class model based on the topic, the sentiment score, and the elapsed time further comprises:
    constructing the class model using a cluster analysis.

4. The method of claim 1, wherein the sentiment score further comprises a set of emotion scores associated with the social media content.

5. The method of claim 1, wherein the first sentiment score is computed using a sentiment analysis component of a natural language processing (NLP) engine.

6. A computer usable program product comprising one or more computer-readable storage media, and program instructions stored on at least one of the one or more storage media, the stored program instructions comprising:
    program instructions to construct, from social media content using a processor and a memory, a class model that is representative of a type and a level of toxicity associated with the content, the class model constructed based on analyzing an interaction between human participants within the social media content to determine a topic associated with the interaction, a sentiment score associated with the interaction, and an elapsed time between a first message in the interaction and a second message in the interaction, the level of toxicity comprising a probability that the interaction will cause another participant on a social media platform to disengage from the interaction;

program instructions to analyze, using the processor and the memory, a first social media message to compute a first level of toxicity associated with the first social media message and assign, based on a first topic and a first sentiment score associated with the first social media message, the first social media message to a first class of the class model, the first level of toxicity comprising a first score related to a presence of a set of keywords related to the first class of the class model in the first social media message and the first sentiment score and a first set of emotion scores associated with the first social media message;

program instructions to analyze, using the processor and the memory, a second social media message to compute a second level of toxicity associated with the second social media message and assign, based on a second topic and a second sentiment score associated with the second social media message, the second social media message to a second class of the class model, the second level of toxicity comprising a second score related to a presence of a set of keywords related to the second class of the class model in the second social media message and the second sentiment score and a second set of emotion scores associated with the second social media message;

program instructions to forecast, based on the first level of toxicity, the first class, the second level of toxicity, and the second class, a forecast toxicity trend related to a sender of the first social media message and of the second social media message, the forecast toxicity trend comprising a predicted toxicity direction and a predicted time period of the predicted toxicity direction; and program instructions to apply, in response to the forecast toxicity trend being forecasted to increase, a remedial measure to reduce the forecast toxicity trend, the remedial measure comprising altering, according to the first level of toxicity and the first class, a distribution within the social media platform of the first social media message and a message sending ability on the social media platform of the sender of the first social media message and of the second social media message; and program instructions to adjust, according to a set of levels of toxicity associated with a set of social media messages sent subsequent to application of the remedial measure, the class model.

7. The computer usable program product of claim 6, wherein program instructions to construct the class model based on the topic, the sentiment score, and the elapsed time further comprises:

program instructions to construct the class model using a latent class analysis.

8. The computer usable program product of claim 6, wherein program instructions to construct the class model based on the topic, the sentiment score, and the elapsed time further comprises:

program instructions to construct the class model using a cluster analysis.

9. The computer usable program product of claim 6, wherein the sentiment score further comprises a set of emotion scores associated with the social media content.

10. The computer usable program product of claim 6, wherein the first sentiment score is computed using a sentiment analysis component of a natural language processing (NLP) engine.

11. The computer usable program product of claim 6, wherein the computer usable code is stored in a computer readable storage medium in a data processing system, and wherein the computer usable code is transferred over a network from a remote data processing system.

12. The computer usable program product of claim 6, wherein the computer usable code is stored in a computer readable storage medium in a server data processing system, and wherein the computer usable code is downloaded over a network to a remote data processing system for use in a computer readable storage device associated with the remote data processing system.

13. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to construct, from social media content using a processor and a memory, a class model that is representative of a type and a level of toxicity associated with the content, the class model constructed based on analyzing an interaction between human participants within the social media content to determine a topic associated with the interaction, a sentiment score associated with the interaction, and an elapsed time between a first message in the interaction and a second message in the interaction, the level of toxicity comprising a probability that the interaction will cause another participant on a social media platform to disengage from the interaction;

program instructions to analyze, using the processor and the memory, a first social media message to compute a first level of toxicity associated with the first social media message and assign, based on a first topic and a first sentiment score associated with the first social media message, the first social media message to a first class of the class model, the first level of toxicity comprising a first score related to a presence of a set of keywords related to the first class of the class model in the first social media message and the first sentiment score and a first set of emotion scores associated with the first social media message;

program instructions to analyze, using the processor and the memory, a second social media message to compute a second level of toxicity associated with the second social media message and assign, based on a second topic and a second sentiment score associated with the second social media message, the second social media message to a second class of the class model, the second level of toxicity comprising a second score related to a presence of a set of keywords related to the second class of the class model in the second social media message and the second sentiment score and a second set of emotion scores associated with the second social media message;

program instructions to forecast, based on the first level of toxicity, the first class, the second level of toxicity, and the second class, a forecast toxicity trend related to a sender of the first social media message and of the second social media message, the forecast toxicity trend comprising a predicted toxicity direction and a predicted time period of the predicted toxicity direction; and program instructions to apply, in response to the forecast toxicity trend being forecasted to increase, a remedial measure to reduce the forecast toxicity trend, the remedial measure comprising altering, according to the first level of toxicity and the first class, a distribution within the social media platform of the first social media message and a message sending ability on the social media platform of the sender of the first social media message and of the second social media message; and
program instructions to adjust, according to a set of levels of toxicity associated with a set of social media messages sent subsequent to application of the remedial measure, the class model.

14. The computer system of claim 13, wherein program instructions to construct the class model based on the topic, the sentiment score, and the elapsed time further comprises:
program instructions to construct the class model using a latent class analysis.

15. The computer system of claim 13, wherein program instructions to construct the class model based on the topic, the sentiment score, and the elapsed time further comprises:
program instructions to construct the class model using a cluster analysis.

\* \* \* \* \*